G. Pratt,
Coal Screen.
No. 35,624.   Patented June 17, 1862.
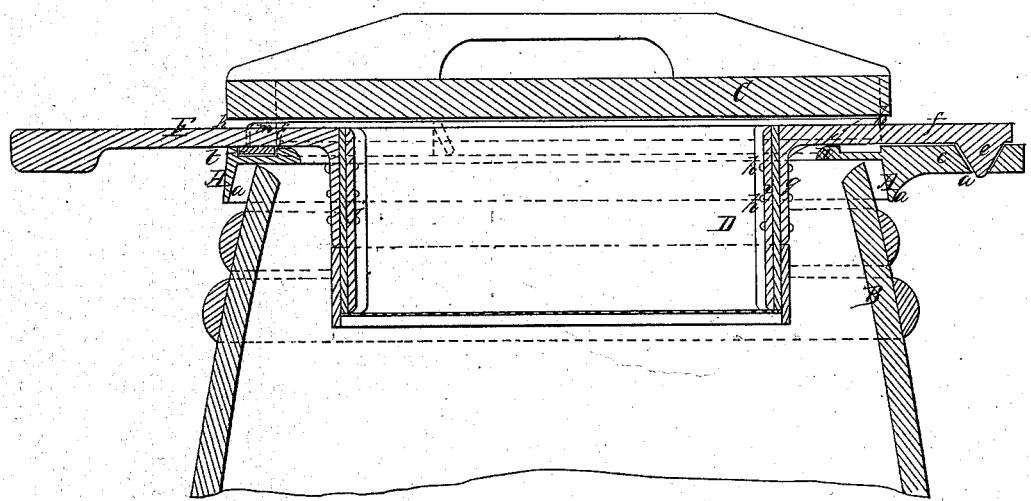
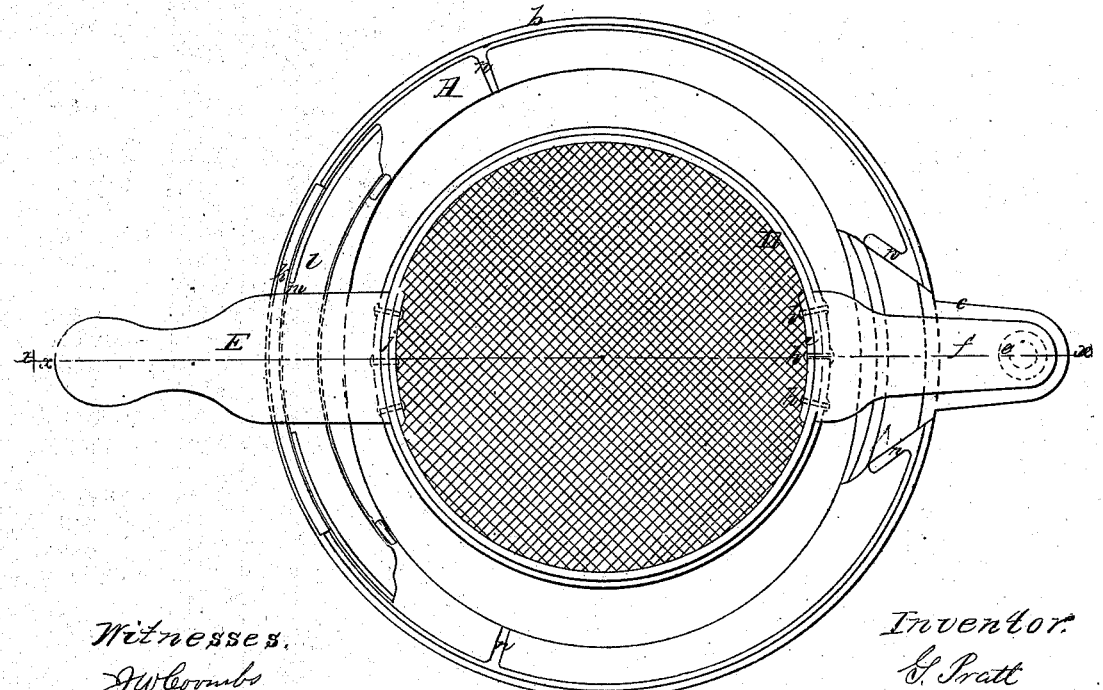
Witnesses.
J W Coombs
Geo Reed
Inventor.
G. Pratt
per Munn & Co
Attorneys

UNITED STATES PATENT OFFICE.

GEORGE PRATT, OF WEST ROXBURY, MASSACHUSETTS.

IMPROVEMENT IN COAL-SIFTERS.

Specification forming part of Letters Patent No. 35,624, dated June 17, 1862.

*To all whom it may concern:*

Be it known that I, GEORGE PRATT, of West Roxbury, in the county of Norfolk and State of Massachusetts, have invented a new and Improved Coal-Sifter; and I do hereby declare that the following is a full, clear, and exact description of the same, reference being had to the accompanying drawings, forming a part of this specification, in which—

Figure 1 represents a vertical central section of my invention, taken on the plane indicated by the line x x, Fig. 2. Fig. 2 is a plan or top view of the same, the cover having been removed.

Similar letters of reference in both views indicate corresponding parts.

This invention consists of a disk or ring, made of cast-iron or other suitable material, and provided with a flange projecting on the under side to fit over a barrel, and with another flange on the top side, and fitted with a socket on one side to receive a swivel that projects from the under side of a plate secured to the sieve, the opposite side of the disk being made to allow a cast-iron handle secured to the sieve to move horizontally, said handle being made of such a width that when it rests on the ring it will keep in its proper horizontal position the sieve to which it is fastened, the dust being prevented from escaping by stops rising in suitable places from the ring, and the open space, wherein the handle travels, being closed by a circular slide of the same diameter as the inside of the flange, which slide is fitted to and moves with the handle in a suitable channel on the rings.

To enable those skilled in the art to make and use my invention, I will proceed to describe its construction and operation with reference to the drawings.

A represents a ring, which is made of cast-iron or any other suitable material, and which is provided with a flange, A, on its under side, to fit on a barrel, B. From the upper surface of said ring a flange, b, projects, which supports the cover C, and an arm, c, which extends from the side of said ring, is provided with a socket, d, to receive a pivot, e, that projects from the under side of a plate, f. This plate is provided with a bracket, g, and it is secured to the sieve D by means of rivets h, passing through the bracket g and through a plate, i, placed on the inside of the sieve, and extending from top to bottom of the same, or nearly so, and secures the two rims of the sieve to each other and with bracket g.

The opposite side of the sieve is suspended from a handle, E, which is secured to its side by means of rivets, and a plate, j, similar to plate i, which serves to fasten the swivel-plate f. Said handle slides horizontally on the surface of the ring A, and it is made wide enough so that it retains the sieve in a horizontal position. An open space, k, in the top flange, b, permits the handle, with the sieve, to oscillate in either direction, and said open space is closed by a circular slide, l, which is of the same diameter with the flange b, and which is provided with a recess, m, to receive the handle. Stops n, projecting from the surface of the ring A, prevent the dust escaping round the edge of the flange. The ring H is made oval on the inside, so as to give sufficient motion to the sieve.

The sieve, the swivel-plate, the slide, and the handle are all level with the top edge of the flange b, and they are kept in place by the cover C, the rim of which is furnished with open spaces to allow the necessary horizontal motion of the handle and swivel-plate.

This sifter gives a more thoroughly shaking motion, and it sifts faster, easier, and better than any sifter that turns on the center.

When the cover is taken off, the whole of the sieve is open for filling and emptying, the clinkers can be picked out and dropped into the barrel before the sifter is removed, and when the sieve is worn out the working parts can be fastened in a few minutes to any common sieve and at a trifling cost. The whole is then as good as new. My sifter is therefore more convenient, cheaper, and more durable than any other sifter now in use.

Having thus fully described my invention, what I claim as new, and desire to secure by Letters Patent, is—

1. The arrangement of the swivel-plate f, projecting from the side of the sieve D, in combination with the disk or ring A and arm c, constructed and operating as and for the purpose specified.

2. The arrangement of the ring A with flanges a b and open space k, in combination with the handle E, circular slide l, stops n, sieve D, cover C, and barrel B, all constructed and operating as and for the purpose herein shown and described.

GEORGE PRATT.

Witnesses:
  BENJ. W. NEWHALL,
  CHAS. H. RHOADES.